W. W. CRATE.
ARTIFICIAL TOOTH.
APPLICATION FILED APR. 2, 1917.
1,246,061.
Patented Nov. 13, 1917.
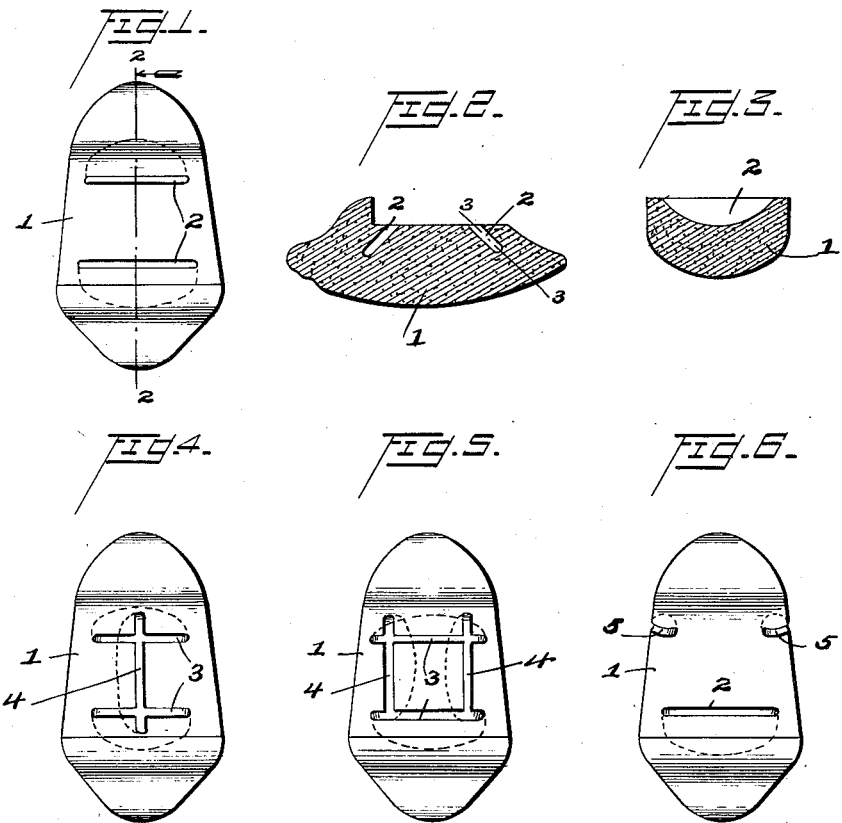
Inventor
Walter W. Crate
Witness
Harold Strauss
By Samuel W. Foster
his Attorney

UNITED STATES PATENT OFFICE.

WALTER W. CRATE, OF CAMDEN, NEW JERSEY.

ARTIFICIAL TOOTH.

1,246,061.     Specification of Letters Patent.     Patented Nov. 13, 1917.

Application filed April 2, 1917. Serial No. 159,326.

*To all whom it may concern:*

Be it known that I, WALTER W. CRATE, a citizen of the United States, residing at Camden, in the county of Camden and State of New Jersey, have invented certain new and useful Improvements in Artificial Teeth, of which the following is a specification.

My invention relates to improvements in artificial teeth, the object of the invention being to so construct the tooth as to provide an improved anchorage at a low cost and without disfiguring the tooth or the finished tooth and support.

A further object is to provide artificial teeth with an improved arrangement of openings or grooves in the back thereof which receive the rubber or other material of the plate, and insure an effectual anchorage against stresses or strains in all directions.

With these and other objects in view the invention consists in certain novel features of construction and combinations and arrangements of parts as will be more fully hereinafter described and pointed out in the claims.

In the accompanying drawings:

Figure 1 is a view in rear elevation, illustrating one form of my improved artificial tooth.

Fig. 2 is a view in longitudinal section on the line 2—2 of Fig. 1, and

Fig. 3 is a view in transverse section on the line 3—3 of Fig. 2, and

Figs. 4, 5, 6, 7, 8 and 9 are views illustrating modifications.

In Fig. 1, I illustrate a tooth 1 having in its back face two grooves 2, 2. These grooves are at their open ends parallel with each other, and extend transversely of the tooth, although I do not limit myself to any particular location of the grooves, as they may be located in various positions other than that shown without departing from my invention.

The grooves 2, 2, from their open ends extend into the body of the tooth at an acute angle to the back face of the tooth and diverge away from each other, so that they are of an appreciably greater distance apart at their inner ends than at their outer ends.

Furthermore, it will be noted by reference to Fig. 3, that the grooves 2 are at their greatest depth at the center and decrease in depth to their ends. In other words, the inner wall of the grooves curves or tapers, and this is accomplished preferably by means of a curved cutting tool which leaves the groove with a tapering inner wall and enables the operator to force the rubber or other material of the plate, while in a plastic condition, into the groove and eject all air from the ends of the groove while the material is being pressed into the center thereof.

In Fig. 4, I illustrate a tooth having two grooves 3, 3, connected by a longitudinal groove 4. All of these grooves incline, and the grooves 3, 3, diverge or incline away from each other, from their open to their closed ends.

In Fig. 5, I illustrate a tooth having two grooves 4, 4, connecting the grooves 3, 3. By providing the two grooves 4, 4, I insure a continuous anchoring element with the walls of all four sides inclined, and In Fig. 6, I show a tooth having a single groove such as shown at 2 in Fig. 1, and in addition provide two short notches or grooves 5, 5, adjacent the edges of the tooth. These grooves 5, 5, incline or taper in a direction opposite to the incline or taper of groove 2.

In most forms of my invention, it will be noted that I provide an anchoring element, preferably a groove or elongated recess located at an acute angle to the back face of the tooth, and in combination with some other anchoring element, either a groove, a recess, or an opening, at an angle to the first mentioned groove or recess, and preferably diverging in a direction opposite to the inclination of the first mentioned groove or recess.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having fully described my invention what I claim as new and desire to secure by Letters Patent is:

1. An artificial tooth, having in its back, spaced from the edges of the tooth, a plurality of independent anchoring elements located at an angle relative to each other and to the back of the tooth, one of said anchoring elements comprising an inclined groove deepest at its center and decreasing in depth toward both ends.

2. An artificial tooth, having in its back a plurality of grooves diverging from each other from their open to their closed ends, said grooves deepest at their centers and decreasing in depth toward both ends.

In testimony whereof I have signed my name to this specification in the presence of two subscribing witnesses.

WALTER W. CRATE.

Witnesses:
KATHRYN A. SUMMERS,
ELEANOR F. MURRAY.